United States Patent
Tanaka

(10) Patent No.: US 11,066,110 B2
(45) Date of Patent: Jul. 20, 2021

(54) FASTENING STRUCTURE FOR VEHICLE

(71) Applicant: Toyota Jidosha Kabushiki Kaisha, Toyota (JP)

(72) Inventor: Motoki Tanaka, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 60 days.

(21) Appl. No.: 16/531,504

(22) Filed: Aug. 5, 2019

(65) Prior Publication Data

US 2020/0047819 A1 Feb. 13, 2020

(30) Foreign Application Priority Data

Aug. 7, 2018 (JP) .............................. JP2018-148674

(51) Int. Cl.
| | | |
|---|---|---|
| *B62D 27/02* | (2006.01) | |
| *B60G 99/00* | (2010.01) | |
| *B62D 21/11* | (2006.01) | |

(52) U.S. Cl.
CPC ........... *B62D 27/023* (2013.01); *B60G 99/00* (2013.01); *B62D 21/11* (2013.01); *B60G 2204/15* (2013.01); *B60G 2206/60* (2013.01)

(58) Field of Classification Search
CPC ...... B62D 27/023; B62D 21/11; B62D 21/00; B60G 99/00; B60G 2204/15; B60G 2206/60
See application file for complete search history.

(56) References Cited

U.S. PATENT DOCUMENTS

| | | | | |
|---|---|---|---|---|
| 2,183,563 A | * | 12/1939 | Hart | B62K 19/20 |
| | | | | 403/264 |
| 4,127,306 A | * | 11/1978 | Foster | B60B 35/06 |
| | | | | 188/218 R |
| 4,168,086 A | * | 9/1979 | Dick | B62D 19/00 |
| | | | | 267/221 |
| 5,567,005 A | | 10/1996 | Kosuge et al. | |
| 6,349,953 B1 | * | 2/2002 | Yoshihira | B60G 7/02 |
| | | | | 280/124.109 |
| 6,375,221 B1 | * | 4/2002 | Kudou | B60G 7/02 |
| | | | | 280/124.1 |
| 9,469,344 B2 | * | 10/2016 | Haselhorst | B62D 21/11 |
| 2004/0140659 A1 | * | 7/2004 | Kato | B62D 21/11 |
| | | | | 280/785 |

(Continued)

FOREIGN PATENT DOCUMENTS

| | | |
|---|---|---|
| DE | 102015220088 B3 | 1/2017 |
| EP | 2902303 A1 | 8/2015 |

(Continued)

*Primary Examiner* — Drew J Brown
(74) *Attorney, Agent, or Firm* — Dinsmore & Shohl LLP

(57) ABSTRACT

In a suspension member having a closed cross section, insertion holes are respectively formed in an upper member and a lower member that are two opposing walls. A collar includes a cylindrical portion and a flange. The cylindrical portion is inserted through the insertion holes. On the upper member side, the cylindrical portion and the upper member are welded together, forming a weld bead. On the lower member side, the outer circumferential edge of the flange and the lower member are welded, forming a weld bead. The welding is applied so that the length of the welding line on the lower member side is longer.

3 Claims, 5 Drawing Sheets

(56) References Cited

U.S. PATENT DOCUMENTS

| | | | |
|---|---|---|---|
| 2005/0275604 A1* | 12/2005 | Park | B62D 21/11 |
| | | | 345/63 |
| 2007/0273179 A1* | 11/2007 | Hommel | B62D 27/065 |
| | | | 296/204 |
| 2015/0217808 A1 | 8/2015 | Haselhorst et al. | |
| 2016/0016611 A1* | 1/2016 | Shirooka | B62D 21/11 |
| | | | 296/187.09 |
| 2018/0015960 A1* | 1/2018 | Lee | F16B 39/021 |
| 2018/0222277 A1* | 8/2018 | Kiehn | B60G 21/052 |
| 2019/0375459 A1* | 12/2019 | Yoshimoto | B62D 25/08 |

FOREIGN PATENT DOCUMENTS

| | | |
|---|---|---|
| EP | 3093219 A1 | 11/2016 |
| FR | 2984237 A1 | 6/2013 |
| JP | H04169379 A | 6/1992 |
| JP | 2016-141339 A | 8/2016 |
| JP | 2017-213982 A | 12/2017 |

\* cited by examiner

FASTENING STRUCTURE FOR VEHICLE

CROSS REFERENCE TO RELATED APPLICATION

This application claims priority to Japanese Patent Application No. 2018-148674 filed on Aug. 7, 2018, which is incorporated herein by reference in its entirety including the specification, claims, drawings, and abstract.

TECHNICAL FIELD

The present disclosure relates to a fastening structure for a vehicle in which a closed section member and a collar are combined.

BACKGROUND

In vehicles, closed section members are often used in order to achieve both weight savings and high rigidity. A cylindrical collar that is a reinforcing member may be used to reinforce a closed section member when the closed section member is fastened to another member with bolts or the like.

JP 2017-213982A discloses that collars are used for a suspension member that includes closed section members. The collars are used to attach stabilizer brackets to the closed section members. Two collars disposed in parallel are welded on a common base provided on one end side of the two collars, and then disposed in the suspension member. Each stabilizer bracket is fastened to the suspension member with two bolts for securing the stabilizer bracket that passes through the collar and through holes of the suspension member.

SUMMARY

In order to fasten a closed section member to another member with sufficient strength, it is necessary to increase fastening strength between the closed section member and the collar.

JP 2017-213982A discloses a structure in which two collars are disposed in parallel. As the collars and the suspension member are fastened merely with bolts, fastening strength therebetween can be improved.

For example, when a cylindrical collar is inserted through a through hole of a closed section member, and the perimeter of the collar and the closed section member are merely welded, only a welding strength depending on the circumferential length of the collar can be obtained.

An object of the present disclosure is to achieve a new structure that improves a fastening strength in a fastening structure for a vehicle in which a closed sectional member and a collar are combined.

The present disclosure discloses a fastening structure for a vehicle in which a collar is used as a reinforcing member to fasten a closed section member. The fastening structure includes two insertion holes that are respectively formed in opposing first and second walls of the closed section member, and the collar that includes a cylindrical portion inserted through the two insertion holes. The cylindrical portion of the collar and the first wall are welded together. The collar includes a flange that extends on the outer circumferential side of the cylindrical portion. The flange is disposed on an outer surface side of the second wall. The flange and the second wall are welded together. The welding is applied such that a welded area on the second wall is larger than a welded area on the first wall.

In the welding, the collar and the first or second wall are melted by heat or pressure and joined together. The welding is not limited to a specific type. For example, fusion welding, such as arc welding or laser welding, or pressure welding, such as spot welding, may be applied. Welding strength is considered to improve with increase in the size of welded area (the cross sectional area around the joint boundary). Thus, the welded areas are determined so that the welding strength at the flange (between the flange and the second wall) is higher than that between the cylindrical portion and the first wall.

In one aspect of the fastening structure for a vehicle according to the present disclosure, the flange has a circular outer circumference. On a second wall side, a circular outer circumferential edge of the flange and the second wall are welded. In this case, because welding is applied in a line having some width, the welded area combining the closed section member and the collar can be considered proportional to the welding length. Thus, the welding length is longer on the second wall side than on the first wall side.

In another aspect of the fastening structure for a vehicle according to the present disclosure, the insertion hole in the second wall is larger than the insertion hole in the first wall but smaller than the flange. On a second wall side, the flange and the second wall are in surface contact, and a circular outer circumferential edge of the flange and the second wall are welded.

According to the present disclosure, because the flange of the collar and the closed section member are welded in a large area, the welding strength improves in comparison with a case without the flange. As a result, the fastening strength can be improved.

BRIEF DESCRIPTION OF DRAWINGS

Embodiment(s) of the present disclosure will be described by reference to the following figures, wherein.

DESCRIPTION OF EMBODIMENTS

Embodiments according to the present disclosure are described below with reference to the attached drawings. Although specific aspects are described below to facilitate understanding, these specifics are provided to show exemplary embodiments. Various other embodiments are also available.

Figure 1:
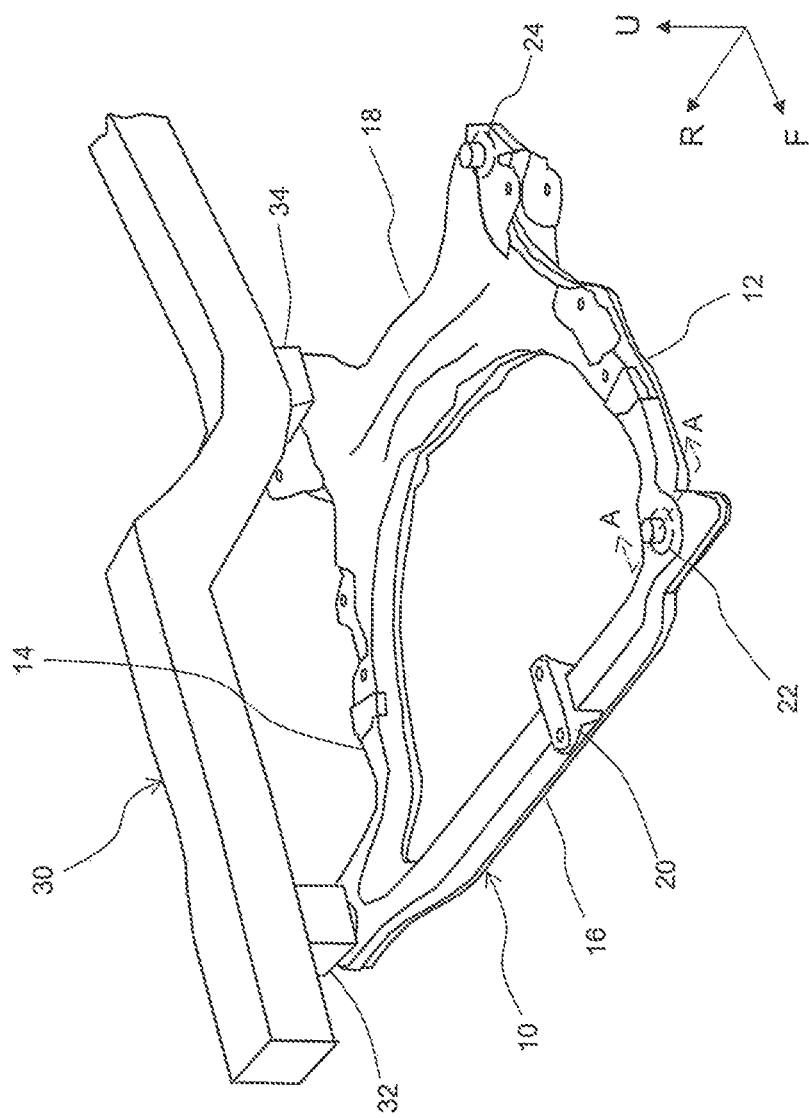
FIG. 1 is a perspective view showing a front structure of a vehicle according to one embodiment.

FIG. 1 is a perspective view showing a partial front structure of a vehicle according to an embodiment of the present disclosure. In the coordinate system shown in the drawings, F, U, and R respectively represent an axis pointing to the front of the vehicle, an axis pointing upwards, and an axis pointing to the right when viewed from the perspective of a passenger. FIG. 1 shows a suspension member 10 and a right front side member 30.

The suspension member 10 is a structural member disposed at the front of the vehicle. The suspension member 10 has a substantial square shape formed by a left side rail 12 (representing the closed section member in the present embodiment) and a right side rail 14, both of which extend along a longitudinal axis (F axis) of the vehicle, and a front cross member 16 and a rear cross member 18, both of which extend along a lateral axis (R axis) and connect the left side rail 12 and the right side rail 14. Lower arms (not shown) are attached to the left side rail 12 and the right side rail 14. An engine mount bracket 20 to which an engine (not shown) is to be secured is fastened to the front cross member 16.

A mount portion 22 is disposed at a left front portion of the suspension member 10, while a mount portion 24 is disposed at a left rear portion. Although being hidden behind the right front side member 30 in FIG. 1, two more mount portions are respectively provided at a right front portion and a right rear portion of the suspension member 10.

The right front side member 30 is a structural member disposed at a right front portion of the vehicle and extends along the longitudinal axis of the vehicle. Together with a left front side member (not shown), the right front side member 30 forms a ladder frame of the vehicle. Two protrusions 32, 34 are disposed at the bottom of the right front side member 30. The protrusions 32, 34 are provided to be fastened with bolts to the suspension member 10 using the right front mount portion and the right rear mount portion of the suspension member 10.

The suspension member 10 receives not only vibrations from the engine that are transferred via the engine mount bracket 20, but also strong vibrations due to road roughness. Thus, it is necessary to secure, with high strength, the suspension member 10 to the right front side member 30 and the left front side member. In particular, due to the structure of the suspension member 10, it is difficult to ensure rigidity around the mount portions 22, 24, because of a relatively large flat surface of a sheet metal panel. Noise and vibration can easily occur (noise and vibration (NV) poor performance environment) around the mount portions 22, 24. In the present embodiment, the structure of the mount portions 22, 24 is improved as described below.

Figure 2:
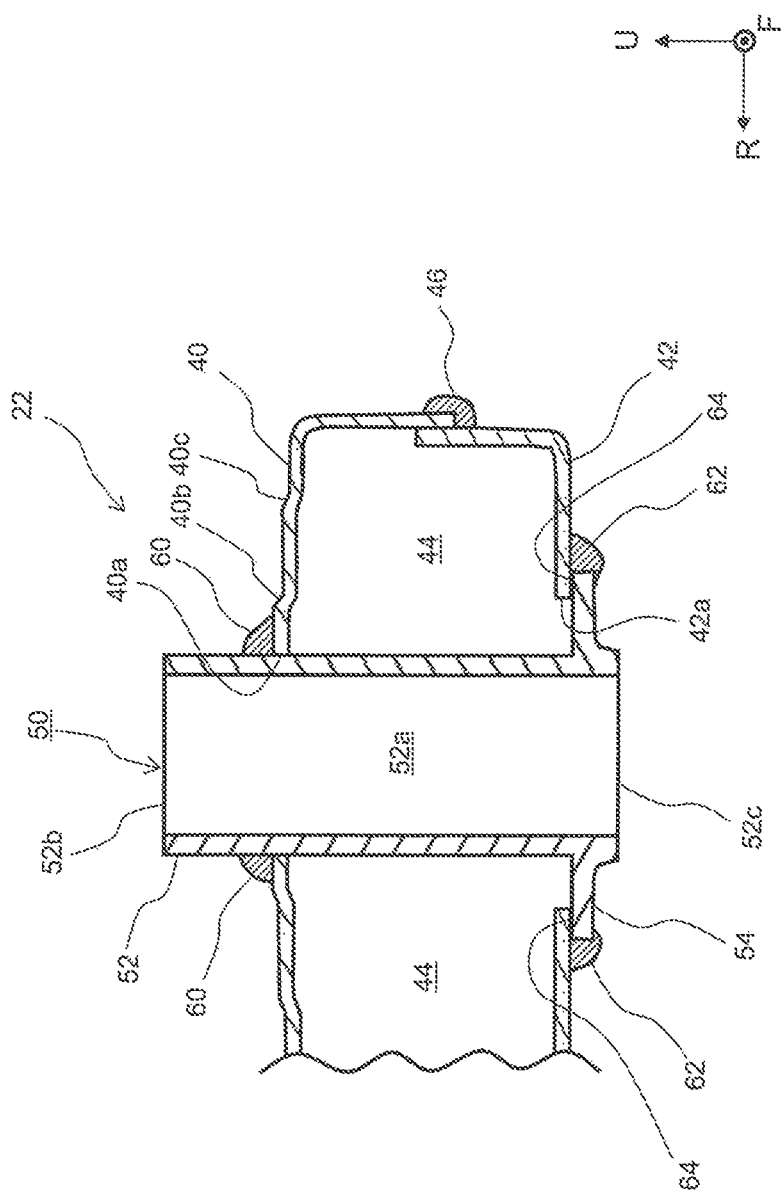
FIG. 2 is a cross sectional view of a mount portion taken along line A-A in FIG. 1.

FIG. 2 is a cross section of the mount portion 22 taken along line A-A in FIG. 1. As shown in FIG. 2, the left side rail 12 shown in FIG. 1 is formed by three-dimensionally assembling an upper member 40 and a lower member 42, each of which is a plate-shaped member made of a metal, such as steel. The upper member 40 and the lower member 42 are arc welded to be secured together. FIG. 2 shows a weld bead 46. Such a connection forms the left side rail 12 as a hollow closed section member having an internal space 44. A closed section member means a hollow member having an internal space enclosed along the entire perimeter in a cross section perpendicular to the longitudinal axis. The closed section member may have open ends at both longitudinal ends. A bolt hole or the like may be provided in walls.

The upper member 40 includes a circular insertion hole 40a. Around the insertion hole 40a, two step rise portions 40b, 40c that are coaxial to the insertion hole 40a are provided. The step rise portions 40b, 40c are provided to enhance rigidity of the upper member 40 in the mount portion 22. Except for the step rise portions 40b, 40c, the upper member 40 is flat and substantially horizontal (when attached to the vehicle) around the mount portion 22. The lower member 42 is formed to be flat and horizontal around the mount portion 22. The lower member 42 includes a circular insertion hole 42a at a vertically coaxial position to the insertion hole 40a.

A collar 50 is inserted and secured in the insertion holes 40a, 42a. The collar 50 is made of metal, such as steel. The collar 50 includes a cylindrical portion 52 and a flange 54. The cylindrical portion 52 is a cylindrical member that has a constant shape along the axis (except for the bottom portion around a lower surface 52c where the cylindrical portion 52 is slightly thicker). The cylindrical wall of the cylindrical portion 52 is thicker than the upper member 40 and the lower member 42. The internal space 52a inside the cylindrical portion 52 has a hollow cylindrical shape through which a bolt is inserted. An upper surface 52b and the lower surface 52c of the cylindrical portion 52 are perpendicular to the axis of the cylindrical portion 52. The flange 54 is an annular portion that extends on the outer circumferential side of the cylindrical portion 52 at a slightly higher portion than the lower surface 52c of the cylindrical portion 52. The flange 54 extends perpendicular to the axis of the cylindrical portion 52. The upper surface and the lower surface of the flange 54 are flat. The flange 54 is thicker than the upper member 40 and the lower member 42.

The collar 50 is vertically disposed so that the cylindrical portion 52 is inserted through the two insertion holes 40a, 42a to penetrate the left side rail 12, as a whole. The insertion hole 40a and the outer circumference of the cylindrical portion 52 are about the same size with a slight gap therebetween. The upper surface of the upper member 40 is arc welded to the outer circumferential surface of the cylindrical portion 52 along the entire edge (2π) of the insertion hole 40a. A weld bead 60 is a welding mark. The arc welding line is applied along a circle where the upper surface of the upper member 40 and the outer circumferential surface of the cylindrical portion 52 are joined. The cross sectional area of the weld bead 60 where the two are joined is proportional to the circumference of the circle. The length L1 of the weld bead 60 can be approximately obtained by the following Equation (1):

$$L1 = \pi \times d \tag{1}$$

where d is the outer diameter (diameter of the outer circumference) of the cylindrical portion 52.

In contrast, the diameter of the insertion hole 42a is larger than the outer diameter of the cylindrical portion 52 but smaller than the outer diameter of the flange 54. Accordingly, a wide ring-shaped gap exists between the outer circumference of the cylindrical portion 52 and the edge of the insertion hole 42a. On the upper surface around the outer edge, the flange 54 is in surface contact with an outer surface of the lower member 42. FIG. 2 shows an overlapping portion 64 in the surface contact. The outer circumferential surface of the flange 54 and the outer surface of the lower member 42 (the surface of the lower member 42 facing downwards) are secured together by arc welding, around which a weld bead 62 is formed.

Figure 3:
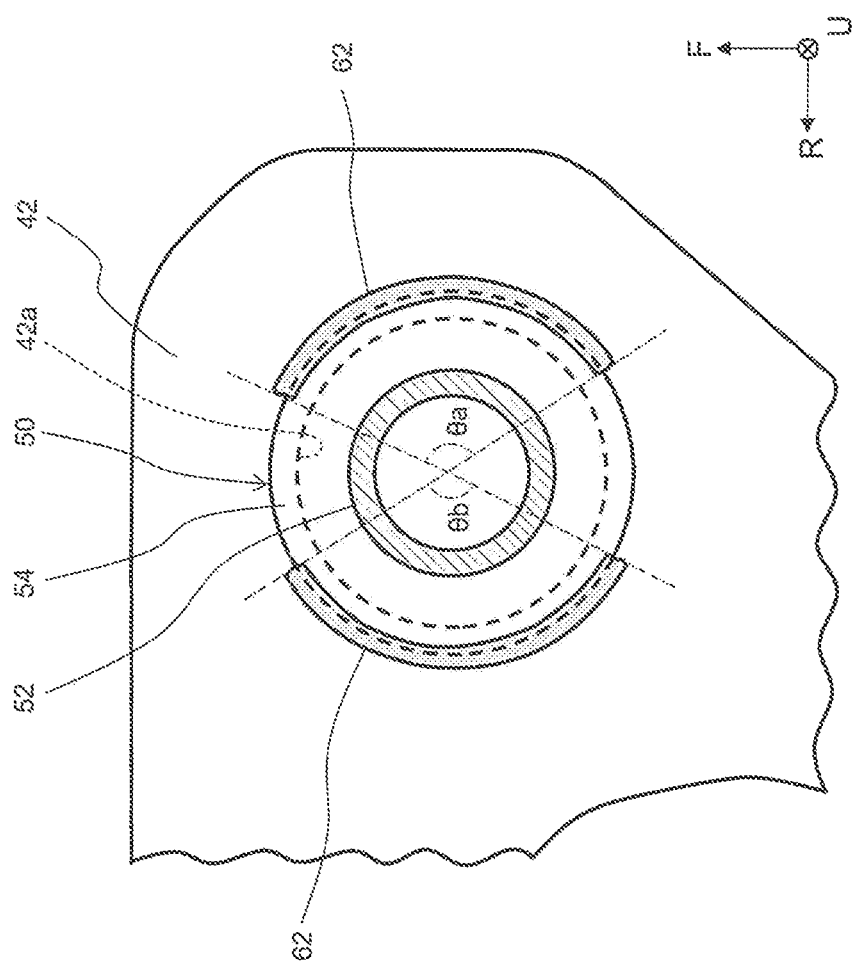
FIG. 3 is a bottom view of the mount portion in FIG. 2.

FIG. 3 is a bottom view (to the positive direction along the U axis) of FIG. 2. In FIG. 3, the upper member 40 and the weld bead 46 are omitted.

As shown in FIG. 3, the collar 50 is inserted in the insertion hole 42a formed in the lower member 42. The outer diameter of the flange 54 that extends around the cylindrical portion 52 of the collar 50 is larger than the diameter of the insertion hole 42a. The flange 54 is disposed to be partially overlapped with the lower member 42. The outer circumference of the flange 54 and the lower member 42 are secured together by arc welding such that the weld bead 62 lies between them. As shown in FIG. 3, the weld bead 62 is formed partially along the circumference of the flange 54. Specifically, welding is applied at two portions in angle ranges θa and θb (radians) about the cylindrical axis. The length L2 of the weld bead 62 can be approximately obtained by the following Equation (2):

$$L2=(\theta a+\theta b)\times D/2 \qquad (2)$$

where D is the outer diameter of the flange 54.

In the embodiment shown in FIG. 3, welding is applied so that the welding strength on the flange 54 side is higher than the welding strength on the cylindrical portion 52 side. In general, the welding strength increases with increasing cross sectional area of the welded portion. In the arc welding according to the present embodiment, because the cross sectional area of the welded portion is proportional to the welded length, the welded length L1 represented by Equation (1) and the welded length L2 represented by Equation (2) are set to satisfy the following relationship:

$$L1<L2 \qquad (3)$$

For example, when d is assumed to be 35 mm, L1 is 110 mm according to Equation (1). When D is assumed to be 80 mm, and θa and θb are respectively assumed to be 2/3×π (θa and θb are 120 degrees each), L2 is 167 mm according to Equation (2). Thus, the relationship defined in Inequality (3) is satisfied. Conditions more severe to Inequality (3) may be set. For example, in place of Inequality (3), there may be set conditions such as L2 being 1.2 or 1.5 times or more L1.

On the flange 54 side, the lengths of the two weld beads 62 are set to be substantially equal to each other (θa=θb), and the two weld beads 62 are positioned to be substantially point symmetrical about the cylindrical axis. In this way, welding is applied to enhance isotropy of the weld bead 62 to ensure high strength against external force from different directions. Welding of the flange 54 at two or more portions that satisfy the relationship defined in Inequality (3) (better with a higher isotropy) can achieve a sufficiently high welding strength on the flange 54 side. Although it is also possible to apply the welding along the entire circumference of the flange 54, time and cost required for the welding process will be increased in that case. Thus, partial welding as shown in FIG. 3 that can ensure a required strength is advantageous.

A series of steps to install the collar 50 are described below in the steps, an initial shape of the upper member 40 is formed by cutting out a predetermined shape from a steel sheet. In this step, the insertion hole 40a is also cut out. Similarly, the lower member 42 is cut out, including cutting out of the insertion hole 42a. Then, after bending processes to predetermined shapes are applied to the upper member 40 and the lower member 42, these two members are assembled and welded together. In this way, the left side rail 12 made from the closed section member is formed. The left side rail 12 is assembled with the front cross member 16, the rear cross member 18, and the right side rail 14 to form the suspension member 10. In the above steps, although the insertion hole 40a and the insertion hole 42a are designed and assembled to be vertically coaxial, in general, these two holes may be slightly misaligned from the common axis within a tolerance.

The collar 50 is inserted from the lower member 42 side with the upper surface 52b of the cylindrical portion 52 placed at the leading end. In this way, as shown in FIG. 2, the cylindrical portion 52 is inserted into the insertion hole 42a and the insertion hole 40a so that the flange 54 is in surface contact with the overlapping portion 64.

In this state, the cylindrical portion 52 and the upper member 40 are welded together. During the weld, a highly accurate angular adjustment is performed so that the cylindrical portion 52 is installed perpendicular to the upper member 40 and the lower member 42. Although the cylindrical portion 52 may be misaligned from the center of the insertion hole 42a of the lower member 42 when the insertion holes 40a, 42a are not vertically aligned, because the flange 54 and the lower member 42 can absorb such a misalignment at the overlapping portion 64 that is sufficiently larger than the tolerance, no manufacturing or strength issues are expected. The accurate perpendicular installation of the collar 50 can ensure sufficiently high strength of the mount portion 22. Further, because the overlapping portion 64 improves the rigidity of the lower member 42 to reduce noise and vibration (NV), the strength along the cylindrical axis can also be enhanced.

Next, the flange 54 and the lower member 42 are welded together. The welding is applied for a length satisfying the relationship defined in Inequality (3) to fasten the two together with sufficient strength. Similarly, three other collars 50 are respectively attached to the other three corners of the suspension member 10.

Then, the suspension member 10 is attached to the protrusions 32, 34 of the right front side member 30 shown in FIG. 1 and the two protrusions of the left front side member (not shown) via the collars 50. Specifically, the upper surface 52b of one of the collars 50 is disposed in contact with a bottom surface of the corresponding protrusion. A bolt hole is provided in the bottom surface of the protrusion. Positioning is performed so that the bolt hole and the opening of the cylindrical portion 52 of the collar 50 are positioned coaxially. A bolt is inserted from the lower surface 52c of the cylindrical portion 52. The head of the bolt is larger than the internal space 52a of the cylindrical portion 52 and tightened to be pressed against the lower surface 52c. The tip of the bolt penetrates the internal space 52a of the cylindrical portion 52 to be inserted in the bolt hole in the bottom surface of the protrusion. As a nut is disposed inside the protrusion, the bolt is screwed into the nut. These steps are performed for the four collars 50. This completes fastening process of the suspension member 10 to the right front side member 30 and the left front side member.

In the above embodiments, the manufacturing method of the collars 50 is not limited to a specific method. However, the rigidity can be increased by unitedly forming the cylindrical portion 52 and the flange 54 by, for example, forging, cutting out, or casting in comparison with assembling separate portions. Further, although the shape of the outer circumference of the flange 54 is assumed to be circular, various other shapes, such as a rectangular or oval shape, that fit the installation space can be applied. A circular shape, however, can be expected to enhance isotropy, improve the rigidity of the collar as a whole, and make it easier to insert the collar during the assembly.

Figure 4:
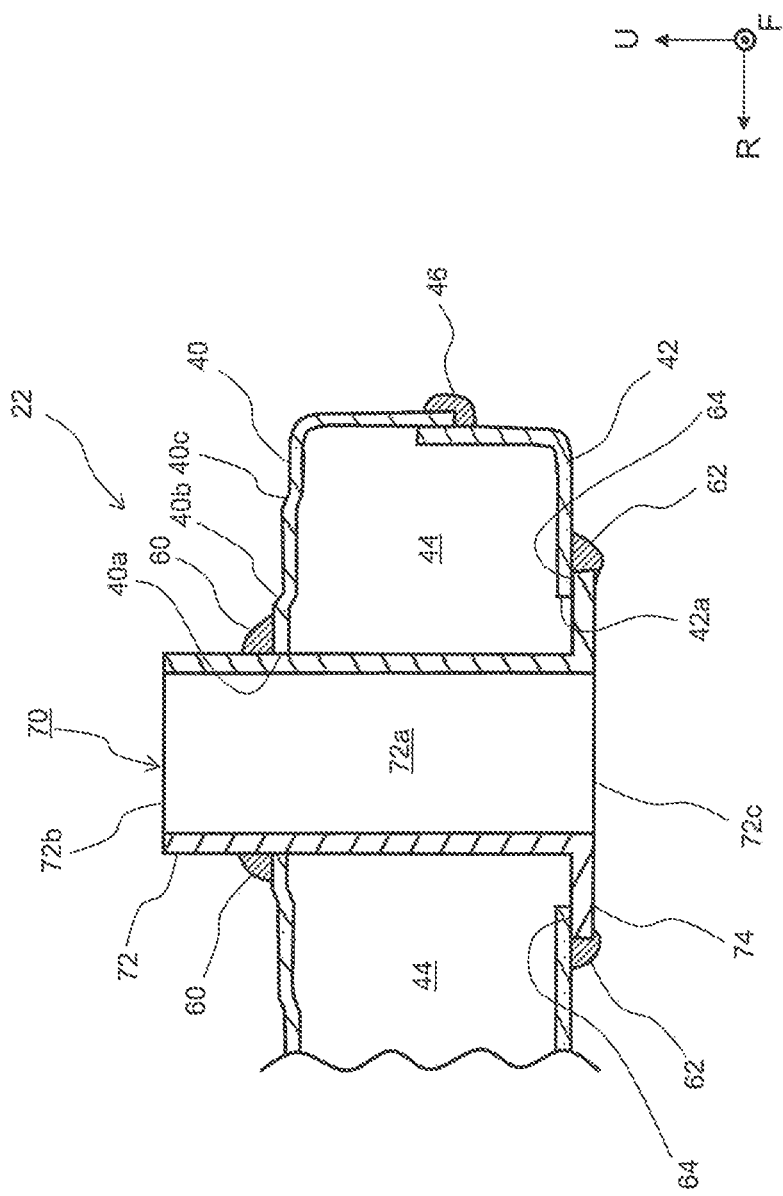
FIG. 4 is a cross sectional view of a mount portion according to a second embodiment.

A second embodiment is described below with reference to FIG. 4. FIG. 4 is a cross sectional view corresponding to FIG. 2. The same reference numerals and characters are assigned to portions identical or corresponding to those in FIG. 2 and their repeated descriptions are omitted or simplified.

In FIG. 4, a collar 70 is used in place of the collar 50 in FIG. 2. The collar 70 includes a cylindrical portion 72 and a flange 74. The collar 70 differs from the collar 50 in that a lower surface 72c of the cylindrical portion 72 of the collar 70 is positioned at the same height as a lower surface of the flange 74. As the height of an upper surface 72b of the cylindrical portion 72 is the same, the cylindrical portion 72 as a whole is shorter along the cylindrical axis.

As the collar 70 can be slightly smaller than the collar 50, weight savings and cost reduction can be expected to be achieved. The bolt that is inserted into an internal space 72a of the cylindrical portion 72 can also be shortened. Because the head of the bolt can be received by a wider area; that is, not only the lower surface 72c of the cylindrical portion 72 but also the lower surface of the flange 74, the bolt fastening can be expected to be more stable.

Figure 5:
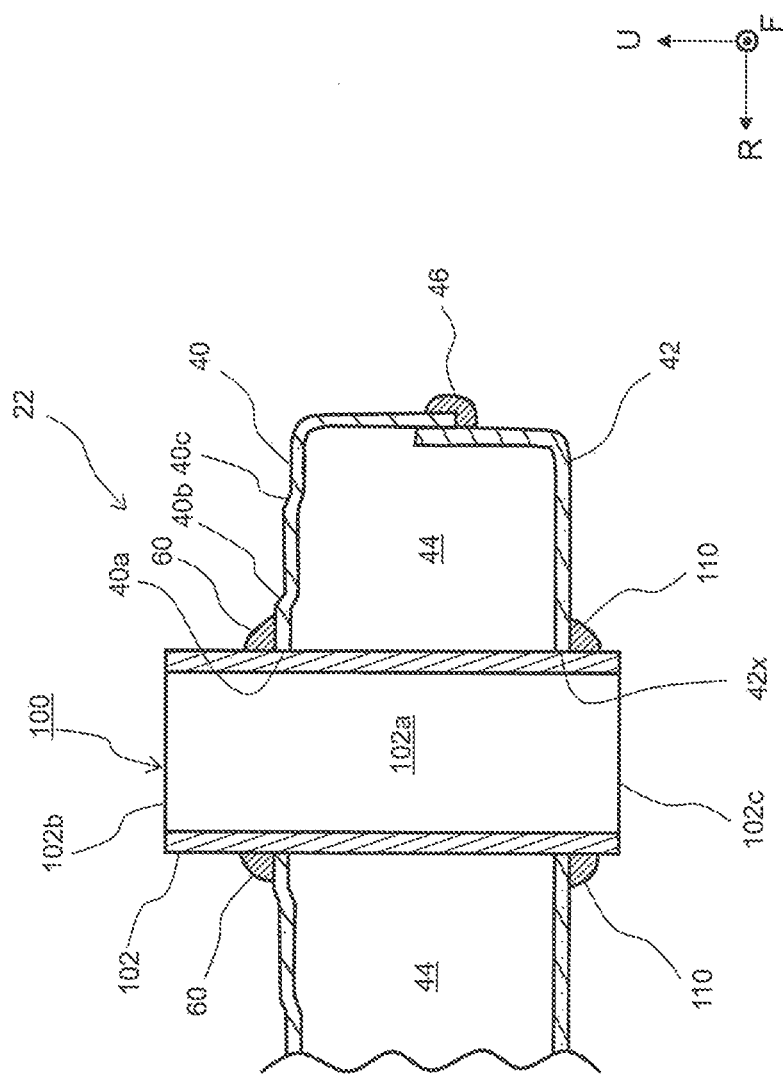
FIG. 5 is a cross sectional view of a mount portion according to a reference embodiment.

A reference embodiment is described below with reference to FIG. 5. FIG. 5 is a cross sectional view corresponding to FIGS. 2 and 4. The same reference numerals and characters are assigned to portions identical or corresponding to those in FIGS. 2 and 4 and their repeated descriptions are omitted or simplified.

FIG. 5 shows a collar 100. The collar 100 includes a cylindrical portion 102, but not a flange. Accordingly, the lower member 42 includes an insertion hole 42x that is slightly larger than the outer diameter of the cylindrical portion 102. Around the insertion hole 42x, the outer circumferential surface of the cylindrical portion 102 and the lower surface of the lower member 42 are arc welded along the entire circumference, forming a weld bead 110. The positions of an upper surface 102b and a lower surface 102c of the cylindrical portion 102 and the shape of an internal space 102a of the cylindrical portion 102 are identical to those in FIG. 2.

In the above structure, in order to vertically set the collar 100, it is necessary to highly accurately set the positions of the insertion holes 40a, 42x through which the collar 100 is to pass, increasing time and cost for installation. The weld length between the outer circumferential surface of the cylindrical portion 102 and the lower surface of the lower member 42 is equal to the outer circumference of the cylindrical portion 102 at the longest. Further, the rigidity of the lower member 42 cannot be reinforced with a large area. In contrast, as described above, these points can be improved by the embodiments shown in FIGS. 2 to 4.

In the above descriptions, fastening between the suspension member 10 and the right front side member 30 and between the suspension member 10 and the left front side member is described merely as an example. The fastening structure according to embodiments of the present disclosure may be applied to other portions in vehicles; for example, between a suspension member and a stabilizer as disclosed in above-described JP 2017-213982A. Another possible aspect, for example, is that a collar is provided with a closed section member, such as the right front side member 30, and fastened to another member. In vehicles, closed section members are used from a weight reducing point of view. However, because sufficient strength cannot be ensured at portions fastened to other members, embodiments according to the present disclosure are advantageous for numerous applications.

The invention claimed is:

1. A fastening structure for a vehicle using a collar as a reinforcing member to fasten a closed section member, the fastening structure comprising:
    two insertion holes respectively formed in opposing first and second walls of the closed section member; and
    the collar comprising a hollow cylindrical portion having an internal space configured to receive a bolt, the cylindrical portion inserted through the two insertion holes,
    wherein the cylindrical portion of the collar and the first wall are welded together,
    the collar comprises a flange, the flange having a circular outer circumferential edge and extending on an outer circumferential side of the cylindrical portion and being disposed on an outer surface side of the second wall, and the circular outer circumferential edge of the flange and the second wall are welded together,
    the weld comprises an arc weld and is applied such that a length of a weld bead on the first wall is longer than a length of a weld bead on the second wall and a welded area on the second wall is larger than a welded area on the first wall.

2. The fastening structure for a vehicle according to claim 1, wherein
    the weld on the second wall is applied at two or more portions on the outer circumferential edge of the flange to be point symmetrical about the flange having a circular shape.

3. The fastening structure for a vehicle according to claim 1, wherein
    the insertion hole in the second wall is larger than the insertion hole in the first wall but smaller than the flange, and
    on a second wall side, the flange and the second wall are in surface contact and a circular outer circumferential edge of the flange and the second wall are welded together.

* * * * *